United States Patent
Wright et al.

(10) Patent No.: US 9,518,592 B2
(45) Date of Patent: Dec. 13, 2016

(54) REAGENT DOSING PUMP ASSEMBLY

(75) Inventors: Keith E. Wright, Chatham (GB); Michael Peter Cooke, Gillingham (GB); David W. Needham, Maidstone (GB); Martin Paul Hardy, Gillingham (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 619 days.

(21) Appl. No.: 14/005,884

(22) PCT Filed: Mar. 22, 2012

(86) PCT No.: PCT/EP2012/055141
§ 371 (c)(1),
(2), (4) Date: Sep. 18, 2013

(87) PCT Pub. No.: WO2012/127010
PCT Pub. Date: Sep. 27, 2012

(65) Prior Publication Data
US 2014/0010640 A1    Jan. 9, 2014

(30) Foreign Application Priority Data
Mar. 22, 2011    (EP) .................................... 11159223

(51) Int. Cl.
*F04D 29/58* (2006.01)
*F01N 3/20* (2006.01)

(52) U.S. Cl.
CPC ............ *F04D 29/58* (2013.01); *F01N 3/2066* (2013.01); *F01N 2610/02* (2013.01);
(Continued)

(58) Field of Classification Search
CPC .... F04D 29/58; F01N 3/2066; F01N 2610/02; F01N 2610/11; F01N 2610/1453; F01N 2610/1433; F01N 2260/024; F01N 2260/02
See application file for complete search history.

(56) References Cited

U.S. PATENT DOCUMENTS

| | | | |
|---|---|---|---|
| 5,440,876 A * | 8/1995 | Bayliss ................ | B01D 53/323 422/173 |
| 7,980,063 B2 * | 7/2011 | Cooke .................... | B01D 53/90 60/286 |

(Continued)

FOREIGN PATENT DOCUMENTS

| | | |
|---|---|---|
| EP | 1 878 920 A1 | 1/2008 |
| EP | 2 060 758 A1 | 5/2009 |

(Continued)

OTHER PUBLICATIONS

International Search Report dated Jun. 11, 2012.

*Primary Examiner* — Igor Kershteyn
*Assistant Examiner* — Eldon Brockman
(74) *Attorney, Agent, or Firm* — Joshua M. Haines

(57) ABSTRACT

A pump assembly having improved cooling for use in a selective catalytic reduction system is disclosed. The pump assembly comprises a pump housing having a body portion and a nozzle portion extending from the body portion, a jacket including a cavity for receiving the pump housing, first and second ports for cooling fluid, and a flow guide disposed between the jacket and the pump housing. The cavity includes a first compartment for cooling fluid defined in part by the flow guide and in part by the pump housing and being in fluid communication with the first port; and a second compartment for cooling fluid defined in part by the flow guide and in part by the jacket. The first compartment is in fluid communication with the second port by way of the second compartment.

14 Claims, 3 Drawing Sheets

(52) U.S. Cl.
CPC ... *F01N 2610/11* (2013.01); *F01N 2610/1433* (2013.01); *F01N 2610/1453* (2013.01); *Y02T 10/24* (2013.01)

(56) References Cited

U.S. PATENT DOCUMENTS

| | | | | |
|---|---|---|---|---|
| 8,388,323 | B2* | 3/2013 | Cooke | F01N 3/2066 417/366 |
| 2003/0108457 | A1* | 6/2003 | Gault | F01N 3/0211 422/177 |
| 2008/0011780 | A1* | 1/2008 | Cooke | B01D 53/90 222/135 |
| 2008/0014103 | A1* | 1/2008 | Cooke | F01N 3/2066 417/410.1 |
| 2008/0141662 | A1* | 6/2008 | Schuster | F01N 3/0814 60/310 |
| 2008/0264048 | A1* | 10/2008 | Nishiyama | B01D 53/9431 60/299 |
| 2012/0014843 | A1* | 1/2012 | Birkby | F01N 3/035 422/180 |
| 2014/0014204 | A1* | 1/2014 | Wright | F16L 53/00 137/594 |
| 2014/0311130 | A1* | 10/2014 | Knittel | F01N 3/2066 60/285 |

FOREIGN PATENT DOCUMENTS

| | | | |
|---|---|---|---|
| JP | 9096212 | A | 8/1997 |
| JP | 2007 321647 | A | 12/2007 |

* cited by examiner

REAGENT DOSING PUMP ASSEMBLY

CROSS REFERENCE TO RELATED APPLICATIONS

This application is a national stage application under 35 U.S.C. 371 of PCT Application No. PCT/EP2012/055141 having an international filing date of 22 Mar. 2012, which designated the United States, which PCT application claimed the benefit of European Patent Application No. 11159223.4 filed 22 Mar. 2011, the entire disclosure of each of which are hereby incorporated herein by reference.

FIELD OF THE INVENTION

The present invention relates to a pump assembly with cooling means. More particularly, but not exclusively, the invention relates to a dosing pump for a selective catalytic reduction system with a cooling jacket arrangement.

BACKGROUND TO THE INVENTION

It is known that exhaust gases from internal combustion engines contain substances which are harmful to the environment and which can pose a threat to public health. For many years, a sustained effort has been made within the automotive industry to reduce the release to the atmosphere of harmful substances carried in exhaust gases, both by modifying the combustion process itself to give a reduced yield of harmful combustion products, and by treating the exhaust gases before their emission into the atmosphere, for example by providing a catalyst to induce chemical breakdown of the harmful constituents, particularly the oxides of nitrogen (NOx), into benign compounds.

One strategy for reducing NOx emissions, known as selective catalytic reduction or SCR, involves the introduction of a reagent comprising a reducing agent, typically a liquid ammonia source such as an aqueous urea solution, into the exhaust gas stream. The reducing agent is injected into the exhaust gas upstream of an exhaust gas catalyst, known as an SCR catalyst, typically comprising a mixture of catalyst powders such as titanium oxide, vanadium oxide and tungsten oxide immobilised on a ceramic honeycomb structure. Nitrogen oxides in the exhaust gas undergo a catalysed reduction reaction with the ammonia source on the SCR catalyst, forming gaseous nitrogen and water. An example of an SCR system is described in the Applicant's European Patent Application Publication No. EP-A-2131020, the contents of which are hereby incorporated by reference.

SCR systems typically include a reagent dosing pump for delivering reagent to the exhaust gas stream. Examples of such pumps are described in the Applicant's European Patent Application Publication No. EP-A-1878920, the contents of which are hereby incorporated by reference.

In one known reagent dosing pump, a solenoid-actuated pumping arrangement is provided to increase the pressure of the reagent, and the pump includes an atomising nozzle that receives the reagent from the pumping arrangement and delivers it from an outlet end into the exhaust gas stream. The nozzle is close-coupled to the pumping arrangement, so that the nozzle and the pumping arrangement form a single unit. The outlet end of the nozzle may be positioned directly in the exhaust gas stream, so that the pumping arrangement is located close to the outside of the exhaust pipe that conveys the exhaust gases.

It will be appreciated that, in such a case, the reagent dosing pump is exposed to the high temperatures that arise in the vicinity of the exhaust system, and so the reagent can be subjected to high temperatures, in use.

The maximum temperature at which urea-based reducing agents can be used is somewhat limited. Urea crystals tend to precipitate when the temperature of the solution is greater than approximately 70° C. Precipitation is undesirable because the precipitates can cause blockages in the delivery system, for example in the small-diameter outlets typically provided in the outlet end of the atomising nozzle. In addition, the formation of precipitates alters the concentration of the remaining solution, so that the effective quantity of ammonia delivered to the exhaust flow becomes uncertain. This could lead to inefficient catalysis and an insufficient reduction in NOx emissions.

It is therefore desirable, in many cases, to provide cooling means to cool the reagent in an SCR system and, in particular, in the reagent dosing pump, to prevent overheating of the reagent. Furthermore, when solenoid-actuated pumping arrangements are used, it is also desirable to cool the solenoid coil since the performance of solenoid actuators can decrease at high temperatures.

In some arrangements, the reagent dosing pump of an SCR system may be mounted on the exhaust pipe under the body of a vehicle. Some cooling of the exhaust gases occurs as the gases flow from the engine to the location of the reagent dosing pump, which limits to a degree the temperature to which the reagent dosing pump, and hence the reagent, is exposed. In such arrangements, sufficient cooling of the reagent dosing pump may be possible by virtue of the cooling air-flow around the reagent dosing pump, and/or by providing suitable insulating means to reduce heat transfer from the exhaust pipe to the regent dosing pump.

In other arrangements, it is desirable to locate the reagent dosing pump in the engine compartment of the vehicle. In these cases, the reagent dosing pump is exposed to higher temperatures, due to the closer proximity of the dosing pump to the engine, and it is more difficult to provide a cooling air flow to the reagent dosing pump. Accordingly, the risk of the reagent overheating in use is higher than in an under-body arrangement.

It would therefore be desirable to provide a pump assembly, suitable for use as a reagent dosing pump in an SCR system, with an improved cooling arrangement.

SUMMARY OF THE INVENTION

Against this background, from a first aspect, the present invention resides in a pump assembly for use in a selective catalytic reduction system. The pump assembly comprises a pump housing having a body portion and a nozzle portion that extends from the body portion to define a pump axis, a jacket including a cavity for receiving the pump housing, first and second ports for cooling fluid, and a flow guide disposed between the jacket and the pump housing.

A first compartment for cooling fluid is defined in part by the flow guide and in part by the pump housing. The first compartment is in fluid communication with the first port. A second compartment for cooling fluid is defined in part by the flow guide and in part by the jacket. The first compartment is in fluid communication with the second port by way of the second compartment.

In use, either the first port or the second port is connected to a source of cooling fluid, and the other port functions as an outlet for the cooling fluid. The cooling fluid is guided by the flow guide to pass adjacent to the pump housing as it flows through the first compartment. Thus, by providing a pump assembly with a flow guide in accordance with the invention, cooling of the pump housing can be optimised.

In one embodiment, the first port comprises an inlet port for supplying cooling fluid to the cavity, and the second port comprises an outlet port for exhausting cooling fluid from the cavity. In use, the cooling fluid flows through the first compartment adjacent to the pump housing to cool the pump housing, then flows through the second compartment before leaving the pump assembly through the second port. In another embodiment, the second port comprises an inlet port for supplying cooling fluid to the cavity, and the first port comprises an outlet port for exhausting cooling fluid from the cavity.

The pump assembly may further comprise a third compartment for cooling fluid defined in part by the flow guide and in part by the jacket, in which case the first compartment may be in fluid communication with the first port by way of the third compartment. By providing a third compartment for cooling fluid, the flow of cooling fluid can be further optimised to maximise the cooling of the pump housing.

Preferably, the pump assembly is arranged such that, in use, cooling fluid flows through the first compartment in a first direction generally parallel to the pump axis, and through the second compartment in a second direction generally opposite to the first direction. When a third compartment is present, the pump assembly may be arranged such that, in use, cooling fluid flows through the third compartment in the second direction also.

The first compartment may extend along the nozzle portion of the pump housing. In this way, the arrangement of the flow guide ensures that the cooling fluid flows over the nozzle portion of the pump housing, and, preferably, along substantially the entire length of the nozzle portion.

The flow guide may, for example, include a generally tubular portion that is arranged concentrically around the nozzle portion of the pump housing. The second compartment may be defined, in part, by the generally tubular portion. The flow guide may comprise an enlarged-diameter portion arranged concentrically around the body portion of the pump housing. The flow guide may therefore be generally bell-shaped.

The flow guide may comprise support means that cooperate with the jacket to support the flow guide in the cavity. For example, when the flow guide includes a generally tubular portion, support means in the form of tabs that cooperate with the jacket may be provided to support the flow guide in the cavity. Alternatively, or preferably in addition, the support means may comprise an annular flange provided on the flow guide. The annular flange may define, in part, the second compartment, so that flow past the flange between the second compartment and the first compartment or, when provided, the third compartment is prevented or restricted.

The jacket may comprise a first jacket part and a second jacket part that seals against or forms a seal with the first jacket part at a joint in the jacket. Such an arrangement is advantageous for manufacturing purposes. When provided, the support means may cooperate with the jacket at the joint. For example, when an annular flange is provided, the flange may be retained between the first and second jacket parts at the joint.

The jacket conveniently comprises a generally tubular portion arranged concentrically around the nozzle portion of the pump housing. The generally tubular portion of the jacket may comprise retaining means for retaining an outlet end of the nozzle portion of the pump housing. In one embodiment, for example, the outlet end is a reduced-diameter portion of the nozzle portion, and the retaining means comprises a flange member having an aperture for receiving the outlet end.

The first and second ports may be perpendicular to the pump axis, and may be offset from the pump axis. Said another way, the first and second ports may define respective first and second fluid flow axes, and each fluid flow axis may be perpendicular to and/or offset from the pump axis.

Preferably, at least a part of the cavity has a circular cross-section, and at least one of the first and second ports is arranged substantially tangentially with respect to the cavity. In this way, cooling fluid can flow into or out of the cavity through the ports in a relatively unhindered manner. In one arrangement, both the first port and the second port are arranged substantially tangentially with respect to the cavity.

The first port may be parallel to the second port and, conveniently, the first and second ports are adjacent to one another. In this way, a compact pump assembly can be provided, and cooling fluid connections to the pump assembly need be connected only to one side of the pump assembly. In another arrangement, the first port is perpendicular to the second port.

The jacket may comprise an inlet port for reagent. The reagent inlet port may be in fluid communication with reagent inlet means provided on the pump housing. For example, a reagent passage may be provided in the jacket to convey reagent from the reagent inlet port to the pump housing. The reagent inlet port may be parallel to and/or adjacent to the first or the second port for cooling fluid. In one example, the reagent inlet port is parallel to and/or adjacent to both the first and second ports for cooling fluid.

Expressed in another way, the present invention resides in a pump arrangement for use in a selective catalytic reduction system, the pump arrangement comprising a pump housing having a body portion and a nozzle portion extending from the body portion, a jacket for receiving the pump housing and defining a volume for cooling fluid, first and second ports for cooling fluid, and flow guide means for guiding the flow of fluid within the volume from the first port to the second port along substantially the entire surface of the pump housing.

Reagents used in SCR systems are typically water-based, and therefore susceptible to freezing at low temperatures. If reagent freezes in a reagent dosing pump, there is a risk of damage to the pump due to the volume expansion of the reagent on freezing.

From a second aspect of the invention, a pump assembly for use in a selective catalytic reduction system is provided. In this second aspect, the pump assembly comprises a pump housing having a body portion and a nozzle portion extending from the body portion to define a pump axis, and a jacket including a cavity for receiving the pump housing. The jacket is arranged to brace the pump housing against expansion of the pump housing along the pump axis.

Because the jacket braces the pump housing along the pump axis against axial expansion forces, the risk of damage to the pump housing in the event that reagent freezes within the pump housing is reduced.

The jacket may comprise retaining means for retaining an outlet end of the nozzle portion of the pump housing, thereby to prevent movement of the nozzle portion away from the body portion.

Similarly, the jacket may comprises support means for supporting a face of the body portion of the pump housing, thereby to prevent movement of the body portion away from the nozzle portion. Conveniently, the support means may comprise a reagent passage that cooperates with reagent inlet means of the pump housing.

Preferred and/or optional features of each aspect of the invention may be used, alone or in appropriate combination, in the other aspects also.

BRIEF DESCRIPTION OF THE DRAWINGS

Embodiments of the present invention will now be described, by way of example only, with reference to the accompanying drawings, in which like reference numerals are used for like parts, and in which.

DETAILED DESCRIPTION OF EMBODIMENTS OF THE INVENTION

Figure 1:
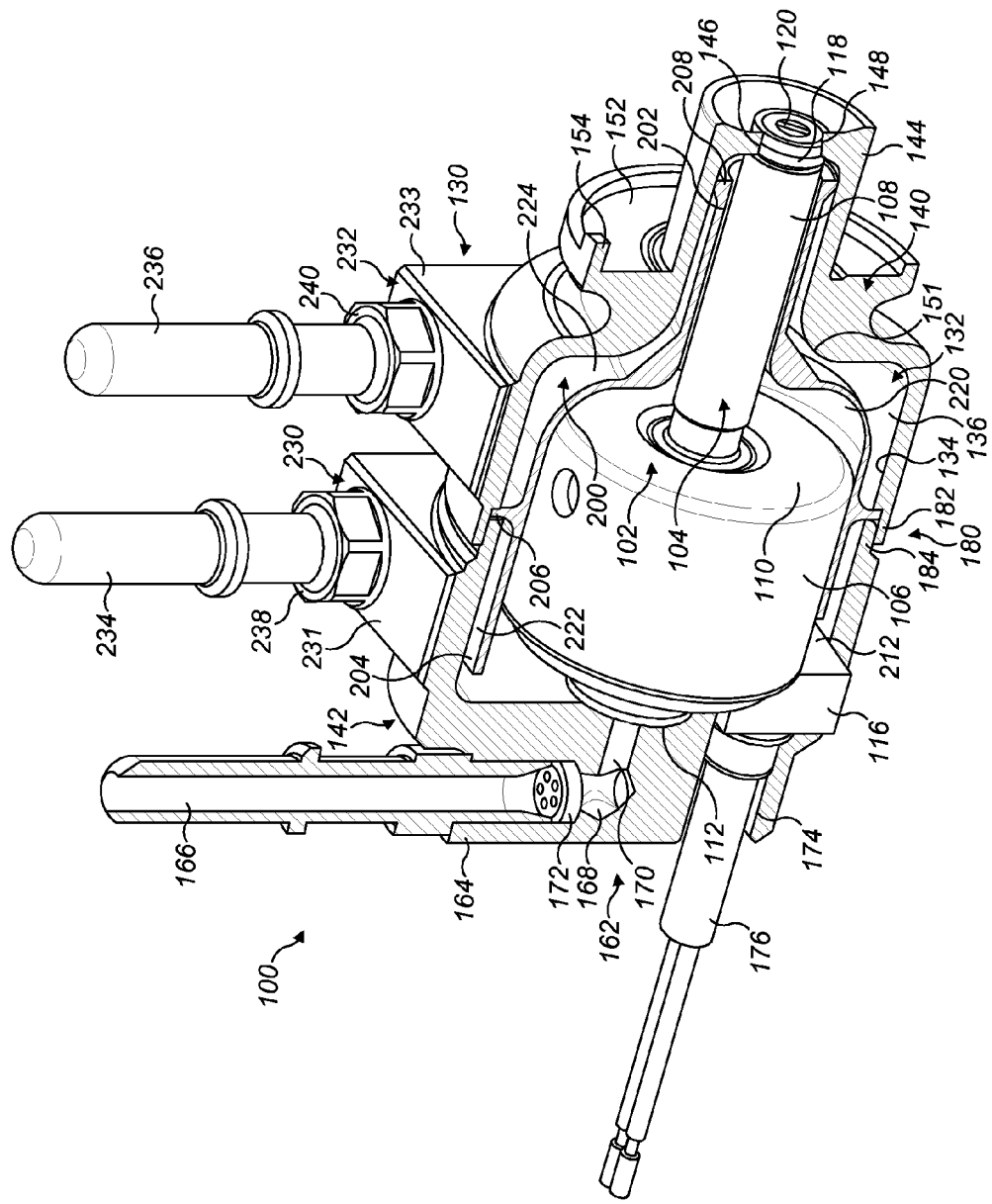
FIG. 1 is a cut-away perspective view of a pump assembly according to the present invention.
Figure 2:
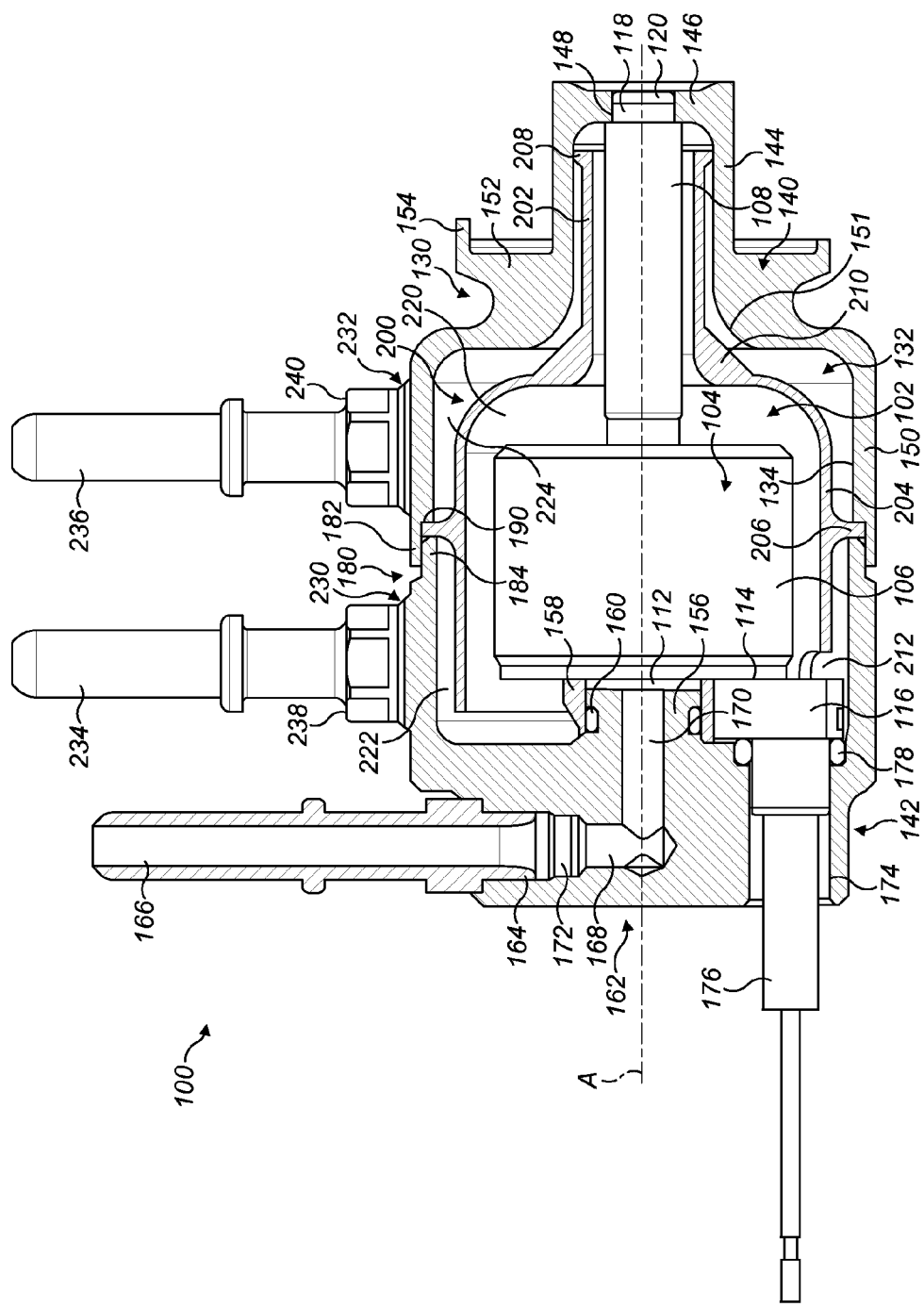
FIG. 2 is a part cross-sectional view of the pump assembly of FIG. 1.
Figure 3:
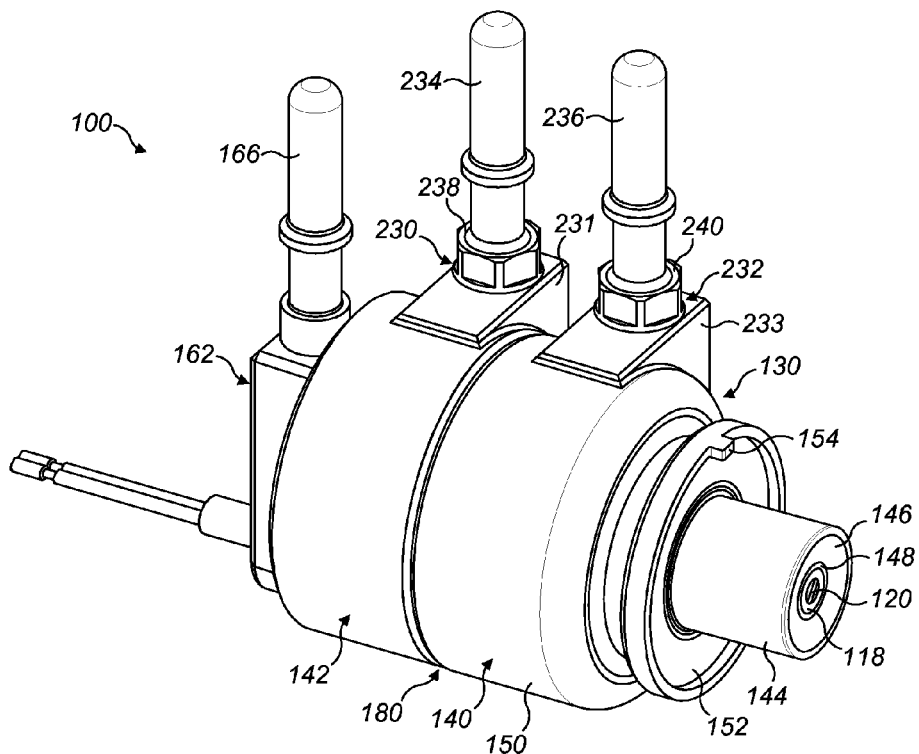
FIG. 3 is a perspective view of the pump assembly of FIG. 1.

A pump assembly 100 according to a first embodiment of the present invention is shown in FIGS. 1 to 3.

Referring first to FIGS. 1 and 2, the pump assembly 100 includes a reagent dosing unit with an integrated pump and nozzle arrangement, referred to hereafter as a reagent dosing pump 102. The pump 102 is a reagent dosing pump of any suitable type, for example as described in EP-A-1878920, to which reference can be made for further details of the pump 102.

The pump 102 comprises a pump housing 104 having a generally cylindrical pump body portion 106 that defines a pump axis (A in FIG. 2), and a generally cylindrical nozzle portion 108 that extends from a first face 110 of the body portion 106 along the pump axis A. The nozzle portion 108 has a relatively small diameter compared to the body portion 106.

The body portion 106 of the pump housing 104 houses a pumping mechanism (not shown), such as a solenoid-actuated pumping mechanism. In use, the pumping mechanism receives reagent through a reagent inlet 112 provided on a second face 114 of the body portion 106, opposite the first face 110. An electrical connection point 116 is also located on the second face 114 of the body portion 106 (not visible in FIG. 1), to provide an operating current to the solenoid actuator of the pumping mechanism. As is known from EP-A-1878920, the pumping mechanism includes a reciprocating pumping element, such as a plunger or piston, and is arranged to increase the pressure of a pre-defined quantity of reagent on each cycle of the pumping element.

The nozzle portion 108 of the pump housing 104 houses a delivery passage (not shown) that, in use, receives the pressurised reagent from the pumping mechanism, and conveys it to a reduced-diameter outlet end 118 of the nozzle portion 108. The outlet end 118 houses an atomising nozzle 120 that atomises the reagent as it exits the pump 102.

The pump assembly 100 also includes a jacket 130 having an internal cavity 132 in which the pump 102 is received. The cavity 132 is defined by an internal wall 134 of the jacket 130. In general terms, the shape of the cavity 132 is an enlarged version of the shape defined by the pump housing 104. In this way, the internal wall 134 of the cavity 132 is spaced from the pump housing 104 to define a volume 136 for cooling fluid therebetween.

The jacket 130 is a two-piece assembly, optionally made from cast stainless steel, comprising a first jacket part 140 that receives the nozzle portion 108 and a part of the body portion 106 of the pump housing 104, and a second jacket part 142 that receives a remaining part of the body portion 106.

The first jacket part 140 comprises a tubular portion 144 that extends along the pump axis A to receive part of the nozzle portion 108 of the pump housing 104. At one end, the tubular portion 144 is provided with an inwardly-directed flange 146 having a central aperture 148 that receives the reduced-diameter outlet end 118. The outlet end 118 is an interference fit in the aperture 148, and additionally may be laser welded or otherwise secured to the flange 146. The interface between the outlet end 118 and the flange 146 is fluid-tight, so as to seal the volume 136 for cooling fluid at the outlet end 118 of the pump 102.

The first jacket part 140 further comprises an enlarged-diameter portion 150 that extends along the axis A away from the outlet end 118 of the pump 102. The enlarged-diameter portion 150 receives a part of the body portion 106 of the pump housing 104, including the first face 110 of the body portion 106.

Adjacent to where the tubular portion 144 and the enlarged-diameter portion 150 of the first jacket part 140 meet, the jacket part 140 is provided with a mounting boss 152 in the form of an outwardly directed flange. In use, the mounting boss 152 is mounted to a port of an exhaust pipe or manifold (not shown), optionally with a sealing gasket, so that the atomising nozzle 120 is positioned in a suitable location for reagent to be dispensed into the exhaust gas stream. A locating tab 154 projects from the mounting boss 152 to engage with a corresponding locating recess (not shown) in the port, to ensure correct orientation of the pump assembly 100 with respect to the exhaust pipe, in use.

The second jacket part 142 is generally cup-shaped to enclose the end of the pump 102 opposite the outlet end 118. The second jacket part 142 therefore receives a part of the body portion 106 of the pump housing 104, including the second face 114 of the body portion 106.

A projection or land 156 extends axially from the internal wall 134 of the cavity 132 in the second jacket part 142 towards the outlet end 118 of the pump, to meet the inlet port 112 on the second face 114 of the housing pump body portion 106. A collar 158 (shown most clearly in FIG. 2) is provided on the second face 114 of the pump body portion 106 that receives the land 156. An O-ring 160 is provided to create a fluid-tight seal between the collar 158 and the land 156.

Referring additionally to FIG. 3, the end of the second jacket part 142 remote from the outlet end 118 comprises a connection block 162 of generally cuboidal shape. A top face of the connection block 162 is provided with a reagent inlet port 164 that receives a tubular reagent inlet connector 166. The inlet connector 166 extends radially with respect to the pump axis A and is connected to a reagent supply line (not shown) in use.

As shown in FIGS. 1 and 2, the inlet port 164 of the connection block 162 is in fluid communication with the reagent inlet 112 of the pump 102 by way of first and second passages 168, 170 in the second jacket part 142. The first passage 168 extends radially inwards from the inlet port 164 of the connection block 162 to intersect the pump axis A, and the second passage 170 extends along the pump axis A from the first passage 168, through the connection block 162 and the land 156, to connect with the reagent inlet 112 of the pump 102. The seal provided by the O-ring 160 prevents leakage of reagent into the cooling fluid volume 136 between the land 156 of the second jacket part 142 and the collar 158 of the pump housing 104.

A filter 172 is located in the flow path between the inlet connector 166 and the reagent inlet 112 of the pump 102. In this embodiment, the filter 172 is received in the inlet port 164. The filter 172 is conveniently a disc filter, arranged to prevent particulate contaminants in the reagent, such as urea crystals, from entering the pump 102.

The connection block 162 is also provided with a drilling 174 to admit an electrical connector 176. The electrical connector 176 connects with the electrical connection point 116 of the pump 102. A further O-ring 178 is provided to seal the electrical connector 176 in the drilling 174.

The first and second jacket parts 140, 142 meet at an annular overlapping joint 180. At the joint 180, a lip 182 of the first jacket part 140 is fitted over a corresponding lip 184 of the second jacket part 142. The joint 180 may be secured and sealed by suitable means, such as by laser welding or by providing an adhesive layer between the lips 182, 184.

As will now be described, the pump assembly 100 is arranged so that, in use, cooling fluid is caused to flow through the volume 136 defined between the internal wall 134 of the jacket 130 and the pump housing 104 in such a way that cooling of the pump 102 is optimised.

Figure 4A:
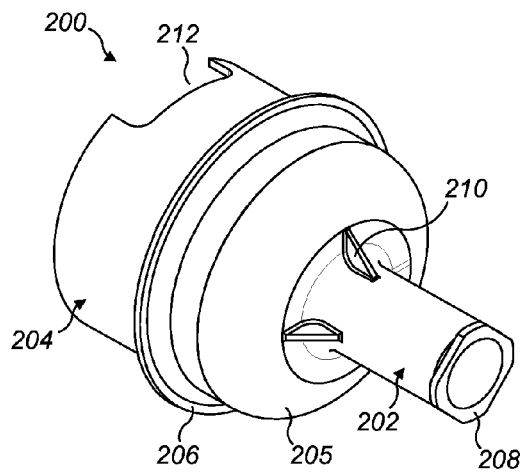
FIGS. 4(a) and 4(b) are perspective and cut-away perspective views, respectively, of a flow guide forming part of the pump assembly of FIG. 1.
Figure 4B:
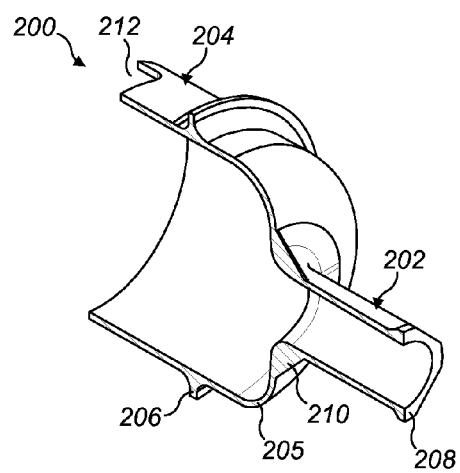

The pump assembly 100 includes a generally bell-shaped flow guide 200 mounted between the pump housing 104 and the jacket 130. The flow guide 200, which is shown in isolation in FIGS. 4(a) and 4(b), is open at both ends and comprises a tubular portion 202 that receives part of the nozzle portion 108 of the pump housing 104, and an enlarged-diameter portion 204 that receives the body portion 106 of the pump housing 104.

The enlarged-diameter portion 204 carries an outwardly-directed annular support or mounting flange 206 that is retained between the first and second jacket parts 140, 142 at the overlapping joint 180 to secure the flow guide 200 in position within the jacket cavity 132. As shown most clearly in FIG. 2, the mounting flange 206 is engaged between the end of the second jacket part 142 closest to the outlet end 118 of the pump 102, and an internal shoulder 190 of the first housing part 140 defined where the lip 182 meets the remainder of the first housing part 140.

The tubular portion 202 of the flow guide 200 ends short of the outlet end 118 of the housing nozzle portion 108. As shown in FIGS. 4(a) and 4(b), four outwardly-extending support tabs 208 are provided around the periphery of the end of the tubular portion 202. When assembled, as shown in FIGS. 1 and 2, the support tabs 208 press against the cavity wall 134, to provide additional support for the flow guide 200 within the jacket cavity 132.

The flow guide 200 is conveniently made from an injection-moulded plastics material. To increase the rigidity of the flow guide 200, support ribs 210 are provided that extend from the tubular portion 202 to the enlarged-diameter portion 204 of the flow guide. A cut-out 212 is provided in the enlarged-diameter portion 204 to accommodate the electrical connection point 116 of the pump 102.

The dimensions of the flow guide 200 are such that there are clearances between the flow guide 200 and the pump housing 104 and between the flow guide 200 and the cavity wall 134, except for where the mounting flange 206 and the support tabs 208 engage with the jacket 130.

The mounting flange 206 is a close fit between the jacket parts 140, 142, so that fluid flow between the mounting flange 206 and the jacket 130 is prevented or at least substantially restricted. In contrast, relatively unrestricted fluid flow is possible around the end of the flow guide 200 where the support tabs 208 are provided, since fluid can flow through the gaps between the tabs 208.

The flow guide 200 divides the cooling fluid volume 136 into three compartments. A first or inner compartment 220 is defined in part by the pump housing 104 and in part by the innermost surface of the flow guide 200. The inner compartment 220 is therefore arranged concentrically around the pump housing 104.

The remainder of the cooling fluid volume 136 outside the inner compartment 220, between the flow guide 200 and the wall 134 of the cavity 132, is divided by the mounting flange 206 into an inlet compartment 222 and an outlet compartment 224, the inlet compartment 222 being farthest from the outlet end 118 of the pump 102, and the outlet compartment 224 being closest to the outlet end 118 of the pump. The inlet and outlet compartments 222, 224 are each arranged concentrically around the inner compartment 220.

The inlet compartment 222 is defined in part by the outermost surface of the enlarged-diameter portion 204 of the flow guide 200 and in part by the cavity wall 134 in the second jacket part 142. The outlet compartment 224 is defined in part by the outermost surface of the enlarged-diameter portion 204 of the flow guide 200, in part by the outermost surface of the tubular portion 202 of the flow guide 200, and in part by the cavity wall 134 in the first jacket part 140.

The inlet compartment 222 is in fluid communication with the inner compartment 220 by way of the open end of the enlarged-diameter portion 204 of the flow guide 200, and the inner compartment 220 is in fluid communication with the outlet compartment 224 by way of the open end of the tubular portion 202 of the flow guide 200. Fluid flow between the inlet compartment 222 and the outlet compartment 224 is prevented or substantially restricted by the engagement of the mounting flange 206 with the jacket 130 at the overlapping joint 180.

An inlet port 230 and an outlet port 232 for cooling fluid are provided on the first and second jacket parts 140, 142 respectively. Each port 230, 232 comprises a passage or drilling (not shown) accommodated in a respective block 231, 233 provided on the circumference of each jacket part 140, 142. A tubular inlet connector 234 is received in the inlet port 230, and a tubular outlet connector 236 is received in the outlet port 232. The connectors 234, 236 are secured to the jacket 130 by retaining nuts 238, 240. In use, the inlet connector 234 is connected to a source of cooling fluid, such as the cooling water system of the engine, by way of a cooling fluid supply line, and the outlet connector 236 is connected to a return line for cooling fluid. Advantageously, the connectors 234, 236 are connected to the fluid lines by means of a press-fit or by suitable fittings provided at the ends of the fluid lines to mate with the connectors 234.

Each port 230, 232 communicates with the cooling fluid volume 136 within the jacket 130 by way of a respective passage (not shown) in the jacket 130. The passage from the inlet port 230 opens into the inlet compartment 222, and the passage from the outlet port 232 opens into the outlet compartment 224.

As shown most clearly in FIG. 3, the inlet and outlet ports 230, 232 are arranged so that the cooling fluid flows into or out of the volume 136 in a direction substantially perpendicular to, and offset from, the pump axis A.

In other words, the inlet port 230 and its respective passage (not shown) are arranged so that fluid flows from the inlet connector 234 into the inlet compartment 222 along a flow axis that is perpendicular to, but does not intersect, the pump axis A. Instead, the flow axis is offset from the pump axis A and is generally tangential to the inlet compartment 222, so that fluid can flow relatively freely into the inlet compartment 222 and around the inlet compartment 222 in an annular manner without encountering obstacles in its flow path that would hinder the flow of fluid.

Likewise, the outlet port 232 and its respective passage (not shown) are arranged so that fluid flows from the outlet compartment 224 into the outlet connector 236 along a flow axis that is perpendicular to, but offset from, the pump axis A, and that is generally tangential to the outlet compartment 224. In this way, fluid can flow relatively freely around the outlet compartment 224 in an annular manner and out of the outlet compartment 224 without encountering flow-hindering obstacles.

To improve further the fluid flow through the cooling fluid volume 136 in use, both the wall 134 of the jacket cavity 132 and the surfaces of the flow guide 200 have smoothed or radiused corners and edges, in preference to sharp corners. For example, where the enlarged-diameter portion 150 meets the tubular portion 144 of the first jacket part 140, a radiused transition region 151 is provided to minimise the resistance to fluid flow in the outlet compartment 224. Similarly, where the enlarged-diameter portion 204 meets the tubular portion 202 of the flow guide 200, a radiused transition region 205 (see FIGS. 4(a) and 4(b)) is provided.

In use, cooling fluid enters the pump assembly 100 through the inlet port 230, and flows first into the inlet compartment 222. The cooling fluid then flows into the inner compartment 220, where it passes between the flow guide 200 and the pump housing 104, where heat is transferred from the pump 102 to the cooling fluid. Once the fluid reaches the end of the tubular portion 202 of the flow guide 200, it passes out of the inner compartment 220 into the outlet compartment 224, passing first between the tubular portions 202, 144 of the flow guide 200 and the first jacket part 140 respectively, and then between the enlarged-diameter portions 204, 150 of the flow guide 200 and the first jacket part 140 respectively. The cooling fluid then passes out of the pump assembly 100 through the outlet port 232.

Because the inlet and outlet ports 230, 232 are arranged generally tangentially with respect to the inlet and outlet compartments 222, 224, the cooling fluid tends to flow in a helical flow path through the cooling fluid volume 136. Advantageously, this increases the time taken for fluid to pass through the pump assembly 100, therefore increasing the time available for heat transfer from the pump 102 to the fluid, in comparison to if the cooling fluid were to flow in a direction substantially parallel to the pump axis A.

By virtue of the flow guide 200, the cooling fluid is guided across substantially the whole of the surface of the pump housing 104 as it flows through the inner compartment 220. Advantageously, therefore, the flow guide 200 ensures efficient transfer of heat from the pump 102 to the cooling fluid. Because the flow guide 200 extends towards the outlet end 118 of the pump 102, the flow guide 200 helps to ensure that the cooling fluid flows along the length of the nozzle portion 108 of the pump housing 104, thereby guarding against overheating of the reagent close to the atomising nozzle 120.

Furthermore, the pump body portion 106, which houses the heat-generating solenoid actuator, may require more cooling than the nozzle portion 108 of the pump housing 104. In this embodiment, therefore, the arrangement of the flow guide 200 causes the cooling fluid to flow first past the pump body portion 106, and then past the nozzle portion 108 of the pump housing 104 before exiting through the outlet port 232. In this way, the cooling capacity of the cooling fluid flow is optimised.

As will be appreciated from FIG. 3, the inlet port 230 and the outlet port 232 for cooling fluid are conveniently provided on the same side of the pump assembly 100, so that the inlet connector 234 and the outlet connector 236 extend parallel to one another. In addition, the flow guide 200 causes the cooling fluid to travel in a first direction parallel to the axis A towards the outlet end 118 of the pump 102 in the inner compartment 220, and then along a second direction that is antiparallel or opposite to the first direction. The cooling fluid is therefore returned towards the inlet port 230. Accordingly, the inlet port 230 and the outlet port 232, and their respective connectors 234, 236 can be positioned adjacent to one another.

In this way, the fluid supply and return lines (not shown) can be connected to the pump assembly 100 in a space-efficient manner, since they need only attach to one side of the pump assembly 100.

Similarly, the inlet connector 166 for reagent extends from the pump assembly 100 in the same direction as the inlet and outlet connectors 234, 236, so that the reagent supply line (not shown) can also be connected to the pump assembly 100 in a space-efficient manner.

Referring back to FIG. 2, it will be appreciated that jacket 130 serves to clamp the pump housing 104 at each end. The outlet end 118 of the nozzle portion 108 of the housing 104 is retained in the aperture 148 in the flange 146 of the first jacket part 140, whilst the second face 114 of the body portion 106 of the housing 104 abuts the land 156 of the second jacket part 142. In this way, the jacket 130 serves to brace the pump housing 104 against any expansion or deformation along the pump axis A that could otherwise occur if reagent were to freeze inside the pump 102. The risk of mechanical failure of the pump housing 104 in such circumstances is therefore reduced, and in particular, the risk of the nozzle portion 108 being forced away from the body portion 106 is mitigated. The flange 146 may have a concave shape, as shown most clearly in FIG. 1, to provide a high degree of resistance to movement of the nozzle portion 108 of the housing 104 away from the body portion 106.

It will be appreciated that many variations and modifications of the invention could be contemplated.

For example, the inlet compartment of the cooling fluid volume could be omitted, for instance by providing a flow guide that is truncated at the position of the mounting flange. In such a case, fluid could flow from the inlet port directly into the inner compartment, but the flow guide would still serve to ensure that the cooling fluid came into contact with substantially the whole surface of the pump housing.

By reversing the position of the inlet and outlet ports of the illustrated embodiment of the invention, the cooling fluid would flow past the nozzle portion of the pump housing before the pump body portion. This could be desirable in some applications, for example where the nozzle portion is exposed to particularly high temperatures in use compared to the pump body portion, or where some heat can be dissipated from the pump assembly by air cooling or other means so that water cooling of only the nozzle portion is required.

The flow guide is conveniently provided as a separate component. However, in some embodiments, the flow guide form part of or is integral with the jacket, or forms part of or is integral with the pump housing. The flow guide may be formed as a single piece, as in the illustrated embodiment, or may be formed from two or more parts that engage with one another or otherwise cooperate.

In the above-described embodiment, the jacket is in two parts, which is convenient for manufacturing reasons. It will be appreciated, however, that the jacket could have any suitable alternative form. For example, a jacket formed from three or more pieces could be provided.

The arrangement of the inlet and outlet ports, the reagent inlet port, and the electrical connection to the pump actuator may be chosen to suit any particular application. For example, it would be possible to arrange the inlet and outlet ports at the same axial distance along the pump assembly, in which case the flow guide could include axially-extending ribs or baffles to divide the cooling fluid volume into suitable inlet and outlet compartments.

In the illustrated embodiment, the inlet and outlet ports for cooling fluid are arranged adjacent to one another on the circumference of the jacket, so that cooling fluid enters and leaves the cooling fluid volume in a direction substantially perpendicular to and offset from the pump axis. However, different arrangements of the inlet and outlet ports are possible.

When at least part of the cavity has a circular cross-section, arranging at least one of the inlet and outlet ports for cooling fluid substantially tangentially with respect to the cavity can be advantageous in terms of optimising the fluid flow within the cavity. It will be appreciated, however, that arranging one or both of the ports in a non-tangential position may be appropriate in particular applications, for example to allow positioning of the device in a particular location in a vehicle engine bay. One or both ports may, for example, be arranged along a respective axis which is perpendicular to and intersects with the pump axis.

In another example, one or both of the inlet and outlet ports may be arranged parallel to the pump axis, and may extend from or be positioned at the end of the jacket opposite the nozzle portion of the pump housing.

In one particular arrangement (not illustrated), the inlet port is relocated from the position shown in the illustrated embodiment to the end face of the jacket, opposite the nozzle end of the device, to open directly into the inner compartment. The outlet port is arranged as previously described with reference to the illustrated embodiment. In this arrangement, cooling fluid enters the cooling fluid volume through the inlet port in a direction substantially parallel to the pump axis, and exits the cooling fluid volume through the outlet port (by way of the outlet compartment) in a direction substantially perpendicular to and offset from the pump axis. A connector for an inlet fluid line may be arranged coaxially with the inlet port. Alternatively, suitable further passages and/or a suitable angled connector may be provided to allow connection of an inlet fluid line to the device in an orientation which is non-parallel to the pump axis. In a variant of this arrangement, the position of the inlet and outlet ports are reversed.

In the illustrated embodiment of the invention, the mounting flange of the flow guide separates the inlet and outlet compartments, and the body of the flow guide separates the inner compartment from both the inlet and outlet compartments. However, alternative ways of separating the compartments can be contemplated. For example, in other embodiments, the inlet and outlet compartments could be separated by an inwardly-directed flange or ridge provided on the jacket, or by a separate separating member such as an O-ring received on the flow guide.

Further variations and modifications not explicitly described above may also be contemplated without departing from the scope of the invention as defined in the appended claims.

The invention claimed is:

1. A pump assembly for use in a selective catalytic reduction system, the pump assembly comprising:
   a pump housing having a body portion and a nozzle portion extending from the body portion to define a pump axis (A);
   a jacket including a cavity for receiving the pump housing;
   first and second ports for cooling fluid;
   a flow guide disposed between the jacket and the pump housing;
   a first compartment for cooling fluid defined in part by the flow guide and in part by the pump housing, the first compartment being in fluid communication with the first port; and
   a second compartment for cooling fluid defined in part by the flow guide and in part by the jacket;
   wherein the first compartment is in fluid communication with the second port by way of the second compartment.

2. A pump assembly according to claim 1, arranged such that, in use, cooling fluid flows through the first compartment in a first direction generally parallel to the pump axis (A), and through the second compartment in a second direction generally opposite to the first direction.

3. A pump assembly according to claim 1, further comprising a third compartment for cooling fluid defined in part by the flow guide and in part by the jacket; and wherein the first compartment is in fluid communication with the first port by way of the third compartment.

4. A pump assembly according to claim 3, arranged such that, in use, cooling fluid flows through the first compartment in a first direction generally parallel to the pump axis (A), and through the second and third compartments in a second direction generally opposite to the first direction.

5. A pump assembly according to claim 1, wherein the first compartment extends along the nozzle portion of the pump housing.

6. A pump assembly according to claim 5, wherein the flow guide includes a generally tubular portion arranged concentrically around the nozzle portion of the pump housing, and wherein the second compartment is defined in part by the generally tubular portion.

7. A pump assembly according to claim 1, wherein the flow guide includes an enlarged-diameter portion arranged concentrically around the body portion of the pump housing.

8. A pump assembly according to claim 1, wherein the flow guide comprises support means that cooperate with the jacket to support the flow guide in the cavity.

9. A pump assembly according to claim 8, wherein the support means comprises an annular flange provided on the flow guide.

10. A pump assembly according to claim 8, wherein the jacket comprises a first jacket part and a second jacket part that seals against the first jacket part at a joint in the jacket, and wherein the support means cooperates with the jacket at the joint.

11. A pump assembly according to claim 1, wherein the jacket comprises a generally tubular portion arranged concentrically around the nozzle portion of the pump housing.

12. A pump assembly according to claim 11, wherein the generally tubular portion of the jacket comprises retaining means for retaining an outlet end of the nozzle portion of the pump housing.

13. A pump assembly according to claim 1, wherein at least a part of the cavity has a circular cross-section, and wherein at least one of the first and second ports is arranged substantially tangentially with respect to the cavity.

14. A pump assembly according to claim 1, wherein the first and second ports are adjacent to one another.

* * * * *